United States Patent
Fuller

(10) Patent No.: US 10,181,270 B1
(45) Date of Patent: Jan. 15, 2019

(54) METHOD, SYSTEM, AND SOFTWARE TO SIMULATE AND PRODUCE NASAL MOLDS FOR A VARIETY OF APPLICATIONS

(71) Applicant: Jennifer Fuller, Boston, MA (US)

(72) Inventor: Jennifer Fuller, Boston, MA (US)

(73) Assignee: Jennifer Fuller, Boston, MA (US)

( * ) Notice: Subject to any disclaimer, the term of this patent is extended or adjusted under 35 U.S.C. 154(b) by 0 days.

(21) Appl. No.: 15/963,064

(22) Filed: Apr. 25, 2018

(51) Int. Cl.
  *G09B 23/28* (2006.01)
  *G09B 23/30* (2006.01)
  *G09B 23/34* (2006.01)

(52) U.S. Cl.
  CPC ............ *G09B 23/30* (2013.01); *G09B 23/34* (2013.01)

(58) Field of Classification Search
  CPC .... G09B 23/28; G09B 23/283; G09B 23/286; G09B 23/30; G09B 23/34
  USPC ........ 434/262, 263, 267, 270, 274, 295, 296
  See application file for complete search history.

(56) References Cited

U.S. PATENT DOCUMENTS

| | | | | |
|---|---|---|---|---|
| 4,209,919 A * | 7/1980 | Kirikae | ................ | G09B 23/30 434/270 |
| 4,708,836 A * | 11/1987 | Gain | ..................... | G09B 23/30 264/222 |
| 5,342,202 A * | 8/1994 | Deshayes | ............... | A61B 5/107 433/215 |
| 6,908,309 B2 * | 6/2005 | Gil | ......................... | G09B 23/30 434/267 |
| 7,648,367 B1 * | 1/2010 | Makower | ............. | G09B 23/285 434/262 |
| 8,376,754 B2 * | 2/2013 | Segal | ..................... | G09B 23/32 434/263 |
| 8,801,986 B2 * | 8/2014 | Matsui | ................ | B29C 67/0081 264/112 |
| 2008/0241808 A1 * | 10/2008 | Badalucca | ............... | A23G 1/50 434/271 |
| 2011/0118527 A1 * | 5/2011 | Giesel | .................. | A61N 5/1049 600/1 |

OTHER PUBLICATIONS

"Incisive Human Nasal Model for ESS Training", 2004.*
Yamamuchi et al, "Development of a Silicone Model for Endoscopic Sinus Surgery", 1999.*

* cited by examiner

*Primary Examiner* — Kurt Fernstrom
(74) *Attorney, Agent, or Firm* — Foley & Lardner LLP

(57) ABSTRACT

A nasal model simulator for surgical/anatomical training includes (a) an anatomic model representing one or more anatomical structures; (b) a boney midface structure that simulates osseous midface and nasal structures; and (C) a simulated septal cartilage configured to fit within the boney midface structure and is constructed of a material which simulates cartilage tissue.

20 Claims, 23 Drawing Sheets

METHOD, SYSTEM, AND SOFTWARE TO SIMULATE AND PRODUCE NASAL MOLDS FOR A VARIETY OF APPLICATIONS

FIELD OF INVENTION

The present invention pertains generally to the fields of engineering, business, and medicine and more particularly to anatomical model devices and related training, demonstration, and business methods.

BACKGROUND

Nasal surgery for the treatment of nasal obstruction, cosmetic deformity, trauma, or neoplasm is one of the most common surgeries performed among otolaryngologists, facial plastic surgeons, and general plastic surgeons and provides improved patient quality of life and productivity. Present solutions for understanding and learning how to perform key surgical procedures is difficult to teach due to the complex nasal anatomy and limited visualization of the anatomical structures during surgery. Furthermore, the nose is a very prominent structure on the face and any imperfectly performed procedures are quite visible, limiting the willingness of teachers to allow their trainees to perform key procedures, significantly limiting successful surgical training.

Septoplasty or submucous resection of the deviated septum has been the mainstay of surgical correction for nasal obstruction. It was found to be the third most commonly performed surgical procedure within otolaryngology, third only to myringotomy and tonsillectomy. See Manoukian P D, Wyatt J R, Leopold D A, Bass E B. *Recent trends in utilization of procedures in otolaryngology-head and neck surgery.* Laryngoscope (1997)107(4):472-477. This procedure is often performed through the nostril (transfixion or hemitransfixion incision) or through an open rhinoplasty approach. Both of these approaches limit the visibility of the working field only to the primary surgeon, making training and surgical instruction difficult. Failure to maintain the integrity of the mucosa on both sides of the septum can lead to a chronic nasal septal perforation which has significant impacts on patient quality of life. See Bohlin L, Dahlqvist A. *Nasal airway resistance and complications following functional septoplasty: a ten-year follow-up study*, Rhinology (1994) 32(4):195-197. Turbinoplasty is another commonly performed procedure aimed at improving nasal airflow in which limited visualization of the structure can limit surgical teaching and trainee understanding.

Increasingly, nasal valve dysfunction (NVD) is being recognized as an underdiagnosed, distinct, and surgically treatable cause of nasal obstruction. When present, and when septoplasty alone is performed, it has been found to be a cause of persistent nasal obstruction and need for revision surgery. See Becker S S, Dobratz E J, Stowell N, Barker D, Park S S. *Revision septoplasty: review of sources of persistent nasal obstruction*, Am J Rhinol. (2008) 22(4):440-444. The external nasal valve, formed by the caudal septum, medial crura of the lower lateral cartilages, alar rim, and nasal sill, and the internal nasal valve, formed by the upper lateral cartilages, dorsal septum, and head of the inferior turbinate, are cross-sectional areas of the nasal cavity with the greatest overall resistance to airflow and thus dominant determinants of nasal patency. Dysfunction can occur either due to narrowing of these areas or as a result of lateral nasal wall collapse in the setting of a weak lateral wall owing to the Bernoulli effect as air accelerates through these segments.

Nasal reconstruction with procedures such as placement of spreader grafts, lateral crural strut crafts, alar batten grafts, and alar rim grafts, among others, are the most commonly performed procedures to correct NVD and have been found to be effective at relieving nasal obstruction. Given the growing evidence supporting the importance of recognizing and treating NVD for symptomatic relief of nasal obstruction, the American Academy of Otolaryngology-Head and Neck Surgery (AAO-HNS) published a Clinical Consensus Statement (CCS) in 2010 to enhance awareness. The CCS defined NVD as a distinct and primary cause of nasal obstruction that can be successfully treated with surgical intervention. See Rhee J S, Weaver E M, Park S S, et al. *Clinical consensus statement: Diagnosis and management of nasal valve compromise*, Otolaryngol Head Neck Surg. (2010) 143(1):48-59. Unfortunately, techniques to treat NVD are quite complex and many surgeons do not feel comfortable with this procedure, leading it to be frequently overlooked, leading to a high failure and revision rate.

Nasal osteotomies are another common procedure performed during rhinoplasty, both for functional and cosmetic indications. Performance of nasal osteotomies are difficult to teach as they are performed blindly and by tactile feedback alone. A recent study found that most facial plastic surgeons do not allow trainees to perform this critical step in rhinoplasty. See Chen J X, Kozin E D, Dedmon M M, Lee L N. *Teaching and practice patterns of lateral osteotomies for rhinoplasty*, Am J Otolaryngol. (2017) 38(4):498-500. Further, teaching sessions using cadaveric specimens were found to increase trainee understanding and confidence with the procedure. See Chen J X, Kozin E D, Shaye D A, Hadlock T, Lindsay R, Lee L N. *Educational Cadaveric Module for Teaching Percutaneous and Intranasal Osteotomies in Rhinoplasty*, Otolaryngol Head Neck Surg. (2017) 156(6):1088-1090. Unfortunately, cadaveric specimens are expensive and difficult to obtain.

Surgical simulation would allow for improved teaching, practice, and understanding of these procedures. Surgical simulation has gained increasing popularity in the United States medical curriculum and has been found to lead to improved surgical performance, medical knowledge, procedural comfort, and skill retention. The Association of Medical Education in Europe (AMEE), a worldwide organization for medical education, reported that simulation-based healthcare education can be used to help novice trainees become proficient in specific tasks and that simulation-based healthcare education with deliberate practice leads to improved and lasting results compared with traditional clinical education. See Motola I, Devine L A, Chung H S, Sullivan J E, Issenberg S B. *Simulation in healthcare education: a best evidence practical guide*, AMEE Guide No. 82. Med Teach. (2013) 35(10):e1511-1530.

Finally, patient understanding of nasal anatomy and the structures that are targeted in these surgeries is quite limited. An anatomically accurate model that can explain the procedures they are undergoing can help improve patient understanding, communication, and expectations.

SUMMARY

The present disclosure relates to devices that are useable for training and demonstrating various procedures including medical, surgical, interventional, technical, and other procedures performed for the purposes of treatment, diagnosis, patient care, education, access, etc.

In accordance with the disclosure, there is provided a nasal model simulator that includes (a) an anatomic model representing one or more anatomical structures; (b) a boney midface structure that simulates osseous midface and nasal structures; and (c) a simulated septal cartilage configured to fit within the boney midface structure and including a material which simulates cartilage tissue.

According to one aspect, the nasal model simulator also includes one or more simulated upper lateral cartilages includes a material which simulates cartilage tissue.

According to one aspect, the nasal model simulator is configured to be altered to have at least one anatomical defect.

According to one aspect, the one or more simulated upper lateral cartilages includes at least one of a narrowed internal nasal valve, a collapsed internal nasal valve, and a detached one or more upper lateral cartilages.

According to one aspect, the nasal model simulator also includes simulated nasal mucosa that simulate mucosal tissue and are configured to be releasably adherent to at least one of the simulated septal cartilage and the one or more simulated upper lateral cartilages.

According to one aspect, the nasal model simulator also includes one or more simulated lower lateral cartilages including a material which simulates cartilage tissue.

According to one aspect, the nasal model simulator is configured to be altered to have at least one anatomical defect.

According to one aspect, the one or more simulated lower lateral cartilages include at least one of a narrowed external nasal valve, a collapsed external nasal valve, a resected simulated lower lateral cartilage, a cephalic malrotation, an inner recurvature of the simulated lower lateral cartilages, and a flared medial crura.

According to one aspect, the nasal model simulator also includes simulated nasal mucosa that simulate mucosal tissue and are configured to be releasably adherent to at least one of the simulated septal cartilage and the one or more simulated lower lateral cartilages.

According to one aspect, the nasal model simulator also includes simulated nasal mucosa that simulate mucosal tissue and are configured to be releasably adherent to the simulated septal cartilage.

According to one aspect, the nasal model simulator also includes simulated external nasal and midface soft tissue and skin constructed of a material which simulates skin and soft tissue.

According to one aspect, the nasal model simulator is configured to be altered to have at least one anatomical defect.

According to one aspect, the boney midface structure includes at least one of an altered nasal bone length, a nasal bone fracture, a boney nasal deviation, a dorsal nasal hump, and an open roof deformity.

According to one aspect, the septal cartilage includes at least one of a septal deviation, one or more septal spurs, one or more septal fractures, and one or more septal perforations.

According to one aspect, the nasal model simulator is configured to be altered to simulate an anatomic defect including one or more of a neoplasm, a tumor resection, and a trauma.

According to one aspect, the nasal model simulator also includes at least one anatomical structure of a turbinate and a nasal lacrimal duct.

According to one aspect, the nasal model simulator is configured to be used for airflow simulation based on at least one of a normal and an altered anatomy.

According to one aspect, the nasal model simulator is configured to conform to a patient-specific anatomy based on a patient-specific imaging.

According to one aspect, the nasal model simulator is configured to be used to demonstrate expected changes in nasal form and function from surgical manipulation.

According to one aspect, the midface structure is configured to fit into at least one of an anatomically correct skull, a hemi-skull, or an external device.

Use of the nasal model simulator will allow the trainee to practice surgical technique and demonstrate proficiency with a given procedure. It will help the audience understand the complex anatomy as well as the way each procedure can change the appearance and function (e.g. airflow) of the nose. The nasal model simulator can also be used for demonstrating, training, promotion of sales of a medical, surgical, or cosmetic procedure.

DETAILED DESCRIPTION AND EXAMPLES

Figure 1A:
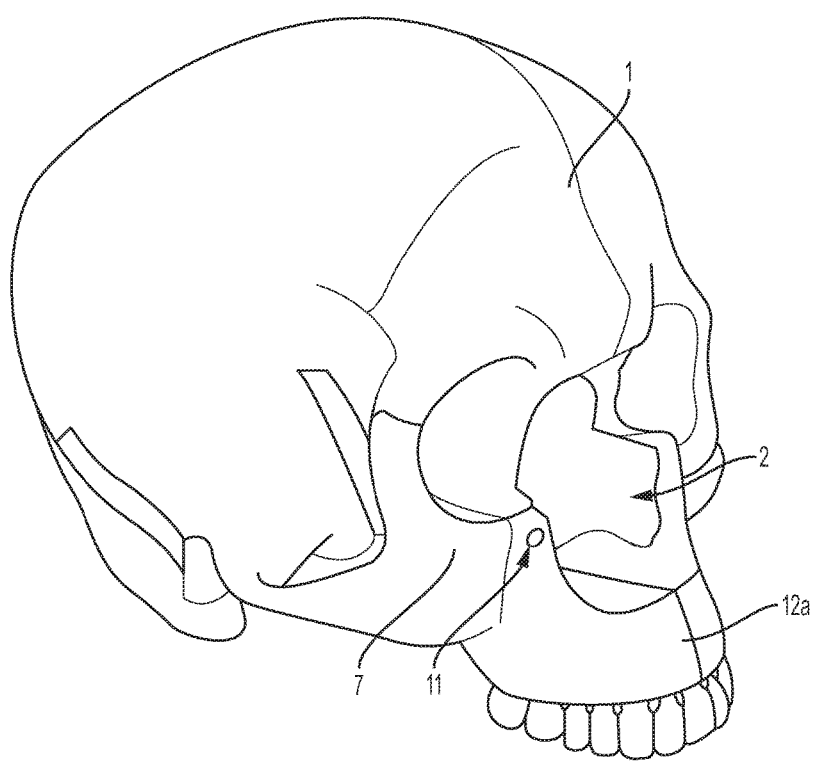
FIG. 1A is an anterolateral perspective view showing an view of a modified skull configured to receive to a nasal model simulator, according to one embodiment.

The nose model simulator device of this invention may take various forms. The following detailed description and the accompanying drawings are intended to describe some, but not necessarily all, examples or embodiments of the invention. The contents of this detailed description do not limit the scope of the invention in any way.

Certain examples of the devices and methods of the present invention are shown in FIGS. 1-18 appended hereto. In these examples, the nose model simulator 100 includes a boney midface model 5, a septal cartilage 39, upper and lower lateral cartilages 41 and 40, inferior turbinates 44, simulated mucosal lining 42, and overlying simulated soft tissue and skin 43. This nose model simulator 100 is configured to fit into a modified skull 1, according to various embodiments, or into a simple foam holder 50 or the like, but the present disclosure is not particularly limited to any the described implementations.

Figure 15A:
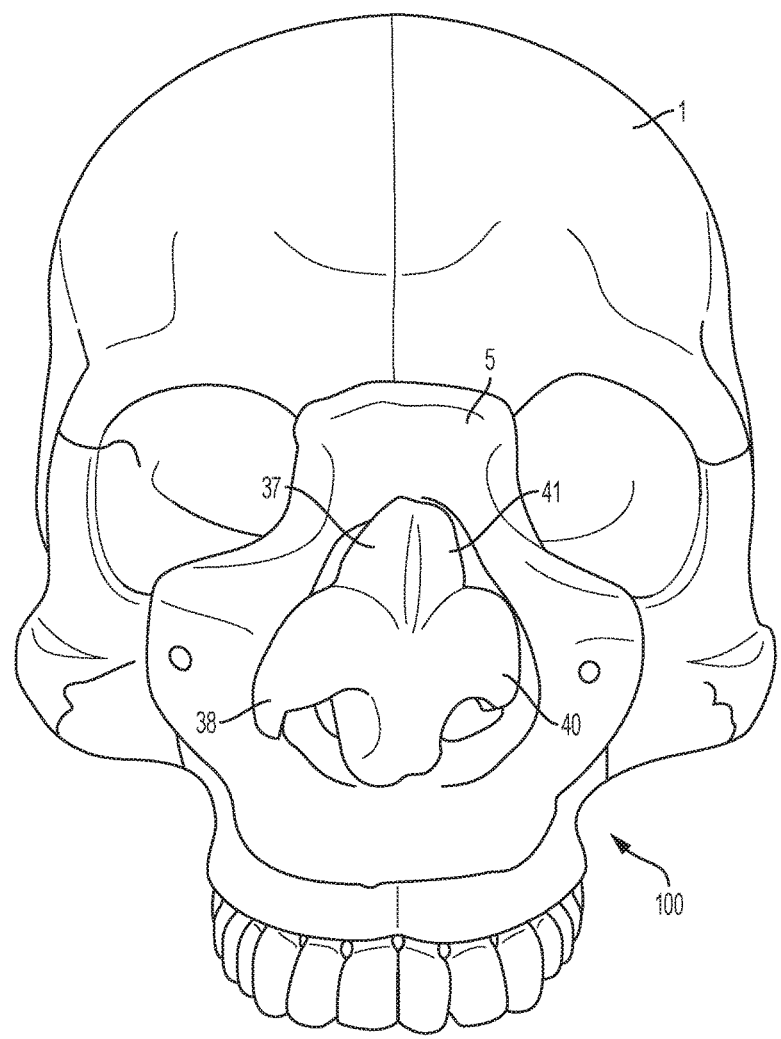
FIG. 15A is a front view of an assembly including nasal cartilages and the midface boney structure shown in FIG. 3A with the modified skull of FIG. 1, according to some aspects.
Figure 15B:
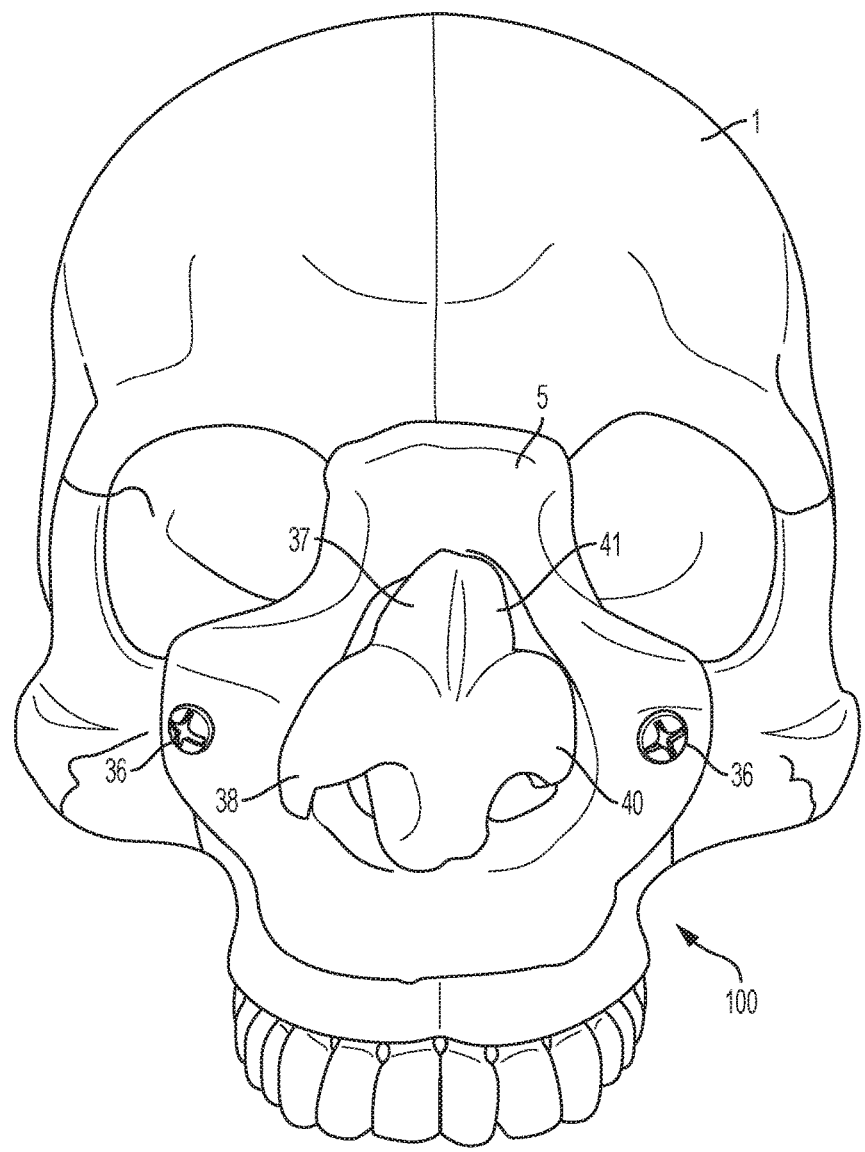
FIG. 15B is a front view of the assembly shown in FIG. 15A including fasteners for securing the assembly.

According to one exemplary embodiment of the present disclosure, a nose model simulator 100, as shown in FIGS. 15A-15B is disclosed and described. The various components of the nose model simulator according to various aspects are described below.

Midface Boney Structure

Figure 3A:
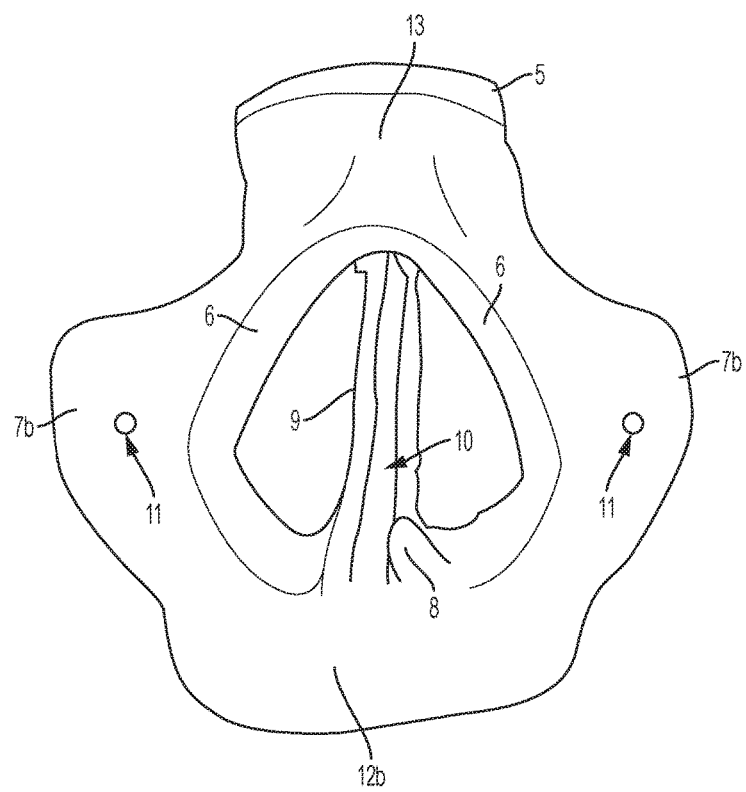
FIG. 3A is a front perspective view showing the midface boney structure, according to an exemplary embodiment.
Figure 3B:
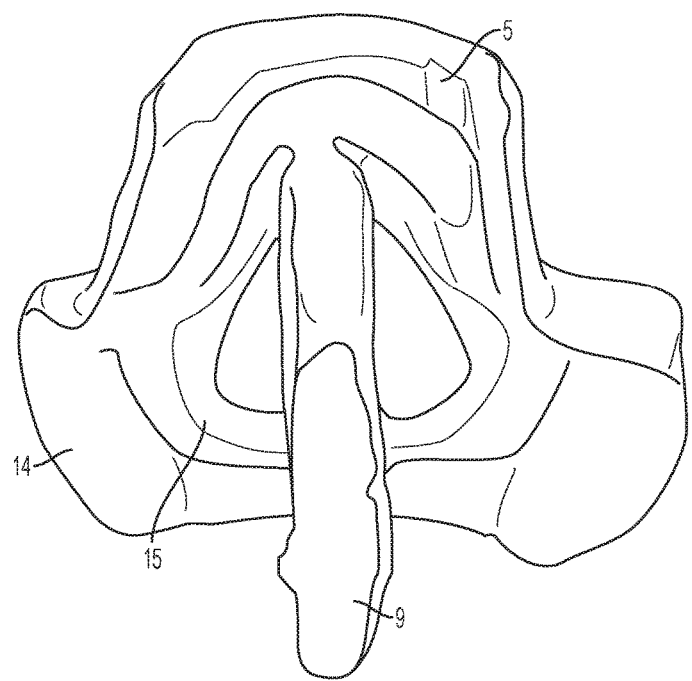
FIG. 3B is a rear perspective view showing the midface boney structure shown in FIG. 3A.
Figure 3C:
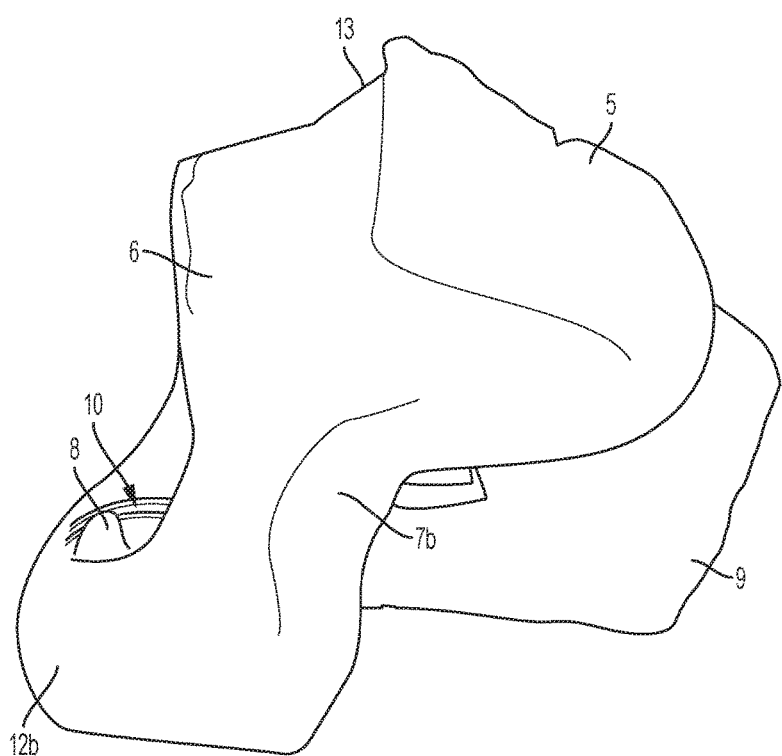
FIG. 3C is a left lateral perspective view of the midface boney structure shown in FIG. 3A.

Referring to FIGS. 3A-3C, according to one aspect, the nose model simulator 100 includes a midface boney model 5. The midface boney structure (e.g., midface boney model) 5 is made of any suitable material, for example, a material that mimics or imitates human bone and is firm but able to be cut using an osteotome (such as a Smooth-on™ Smoothcast 320 plastic resin, though other materials can be used). The midface boney structure 5, according to one aspect, is made of a material which is disposable.

As shown in FIGS. 3A-3C, the midface boney structure 5 includes one or more (for example, two) lateral nasal bones 6 and a skull midface portion 7b. The midface boney structure also includes an anterior nasal spine 8 which includes a posterior boney septum 9 and a slot 10 configured to house or hold cartalginous septum. Accordingly, as shown in FIG. 3A, the slot 10 is positioned within the maxillary crest and posterior bony septum 9 where the simulated cartilaginous septum fits. The midface boney structure 5 also includes one or more holes 11 which correspond to the one or more holes 11 of a modified skull 1 (described in more detail below). The holes 11 of the midface boney structure 5 are configured to receive fasteners (for example, fasteners 36 shown in FIG. 12) which are useable to securably attach the midface boney structure 5 to the modified skull 1. The midface boney structure 5 also includes an inferior maxilla portion 12b. According other aspects, the midface boney structure 5 also includes a portion of the medial orbital wall, maxilla, nasal bones, maxillary crest and posterior boney septum. The midface boney structure 5, according to one example, also includes nasion 13.

Figure 4:
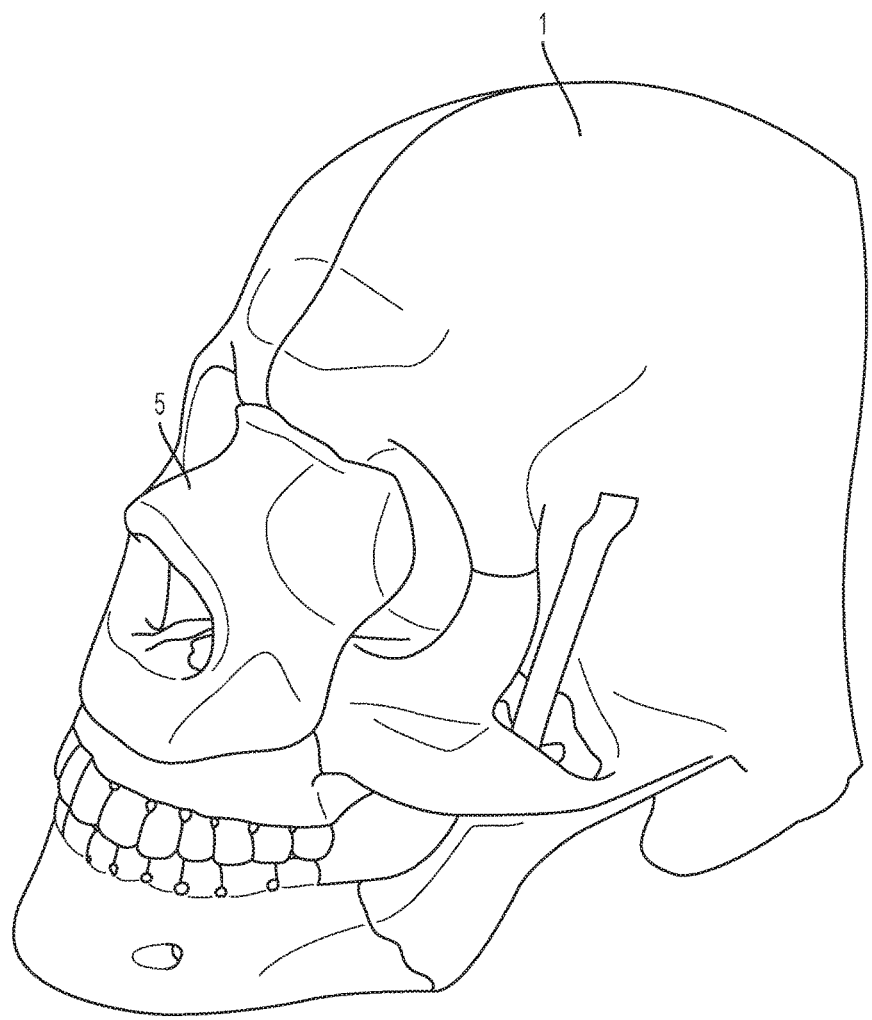
FIG. 4 is a left lateral perspective view of the modified skull shown in FIG. 1A with the midface boney structure shown in FIG. 3A.
Figure 12:
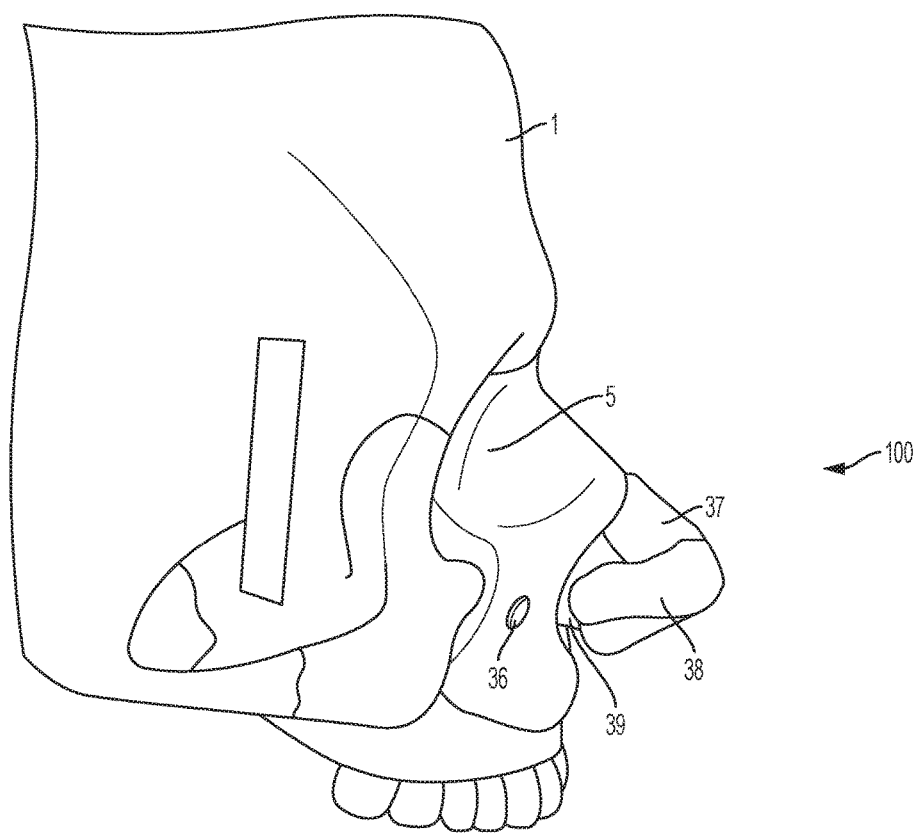
FIG. 12 is a lateral view of an assembly including the modified skull shown in FIG. 1A and the casts shown in FIGS. 9 and 10.

The midface boney structure 5 is configured to mimic or imitate a portion of the defined midface anatomy, including at least the nasal bones and piriform aperture. This midface boney structure 5 is formed such that it is able to be placed into a modified skull 1 and secured into place (as shown in FIG. 4), for example, using fasteners (e.g., screws) 36 as shown in FIG. 12. The midface boney structure 5 is configured such that the peripheral portion 14 (shown in FIG. 3B) of the midface boney structure 5 overlays the modified skull 1 (shown in FIGS. 1A-1B) and a portion 15 (shown in FIG. 3B) which is configured to fit within the midface cavity 2 of the modified skull 1.

Figure 2:
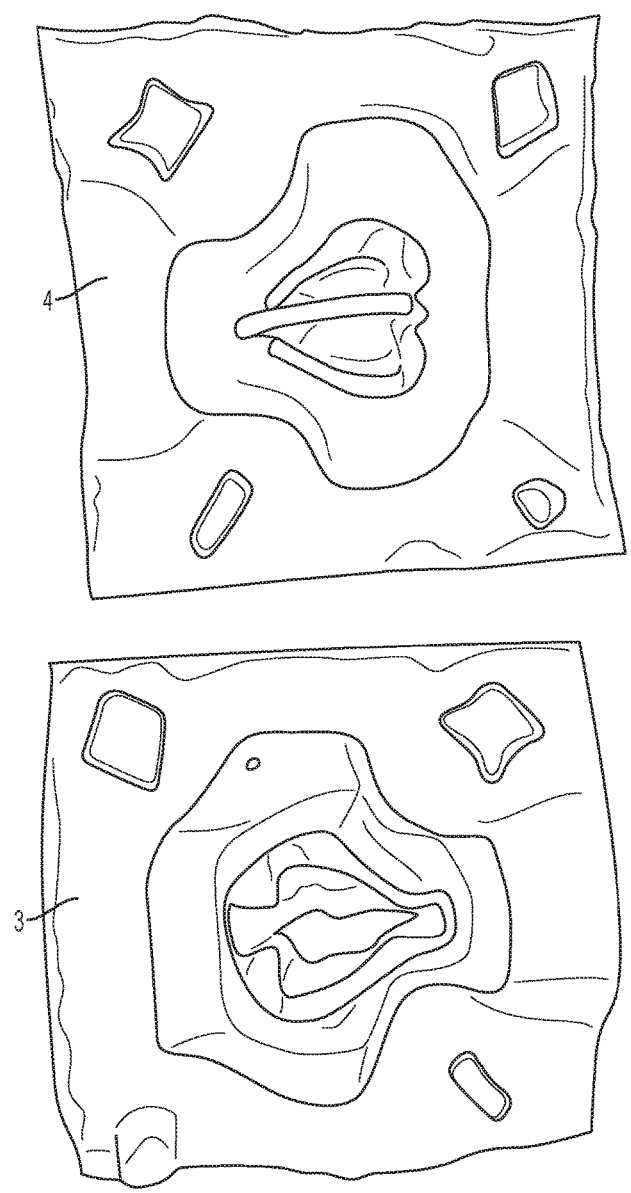
FIG. 2 is a top view of molds, according to various embodiments, which are useable to create a midface bony structure of a nasal model simulator.

The midface boney structure 5 is configured to be modified to have various anatomic differences including different nasal bone lengths, a dorsal deviation, a dorsal hump, fractures, an open roof deformities, etc. The midface boney structure 5 can either be computer generated and then printed on a 3D printer or sculpted using an epoxy or clay, creating a mold, and then casting with a plastic resin, or the like, within the mold. FIG. 2 shows an example of the molds used to create the midface bony structure 5 shown in FIGS. 3A-3C. The molds includes a posterior nasal bone mold 3 and an anterior nasal bone mold 4.

Figure 5:
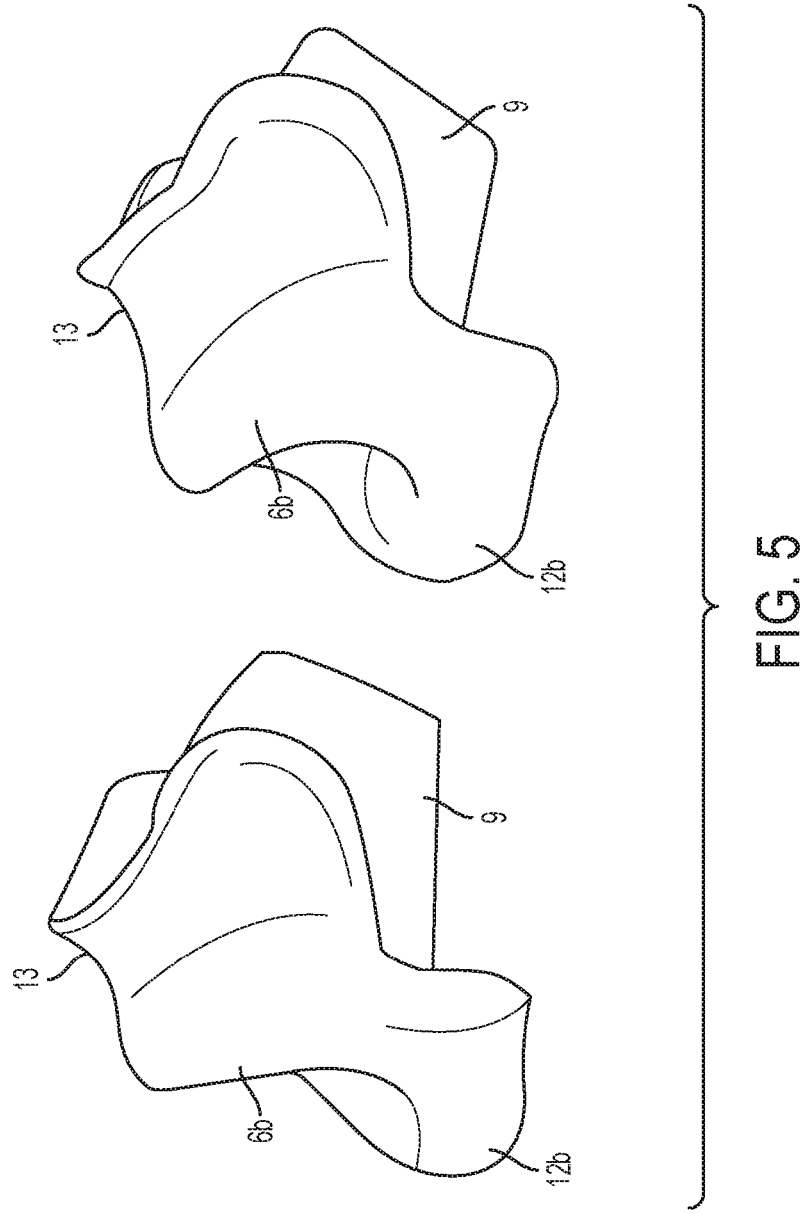
FIG. 5 is a perspective view of the midface boney structure shown in FIG. 3A, according to various aspects.
Figure 18:
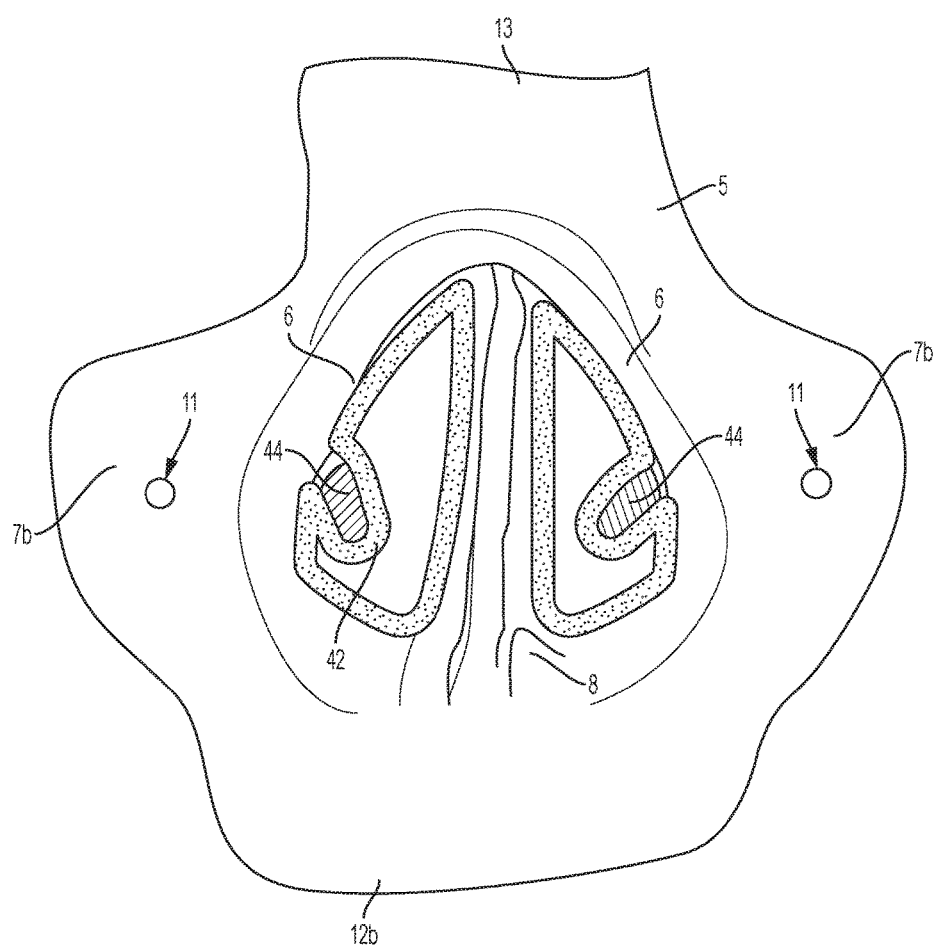
FIG. 18 is a front view of the midface boney structure shown in FIG. 3A having an alteration to include the bone of the inferior turbinate and the surrounding mucosa.

FIG. 5 shows an example of how the mold can be modified to yield different anatomical features of the midface boney structure 5 for better training and education, As shown in FIG. 5, for example, the midface boney structure 5 includes an altered length of the nasal bone 6 shown as altered lateral nasal bone 6b. The midface boney structures can also be modified to include the bones of the inferior turbinates 44, as shown in FIG. 18 or nasolacrimal ducts.

Nasal Cartilages

Figure 9:
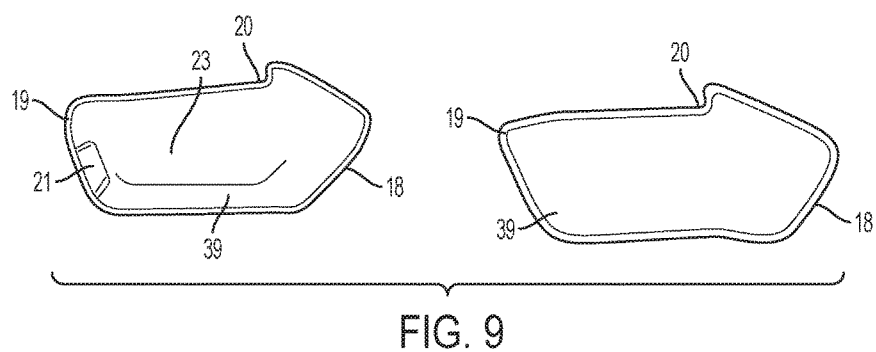
FIG. 9 is a lateral view of casts of septal cartilages using silicone created by the molds of FIG. 6, according to various embodiments.

Referring to FIGS. 9-12, according to one aspect, the nose model simulator 100 includes nasal cartilages including right upper lateral cartilage 37 and left upper lateral cartilage 41. The nose model simulator 100 also includes right lower lateral cartilage 38 and left lower lateral cartilage 40. As shown in FIG. 9, the nose model simulator 100 also includes septal cartilage 39 including anterior septum 18 and posterior 19. The septal cartilage 39 can be altered to also include septal spur 23 and indentation 21 which is configured to facilitate the septum fitting into the posterior boney septum 9 of the midface boney structure 5. The septal cartilage 39 also includes a notch 20 which is configured to be attachable to the lateral nasal bones 6 of the midface boney structure 5.

Figure 11A:
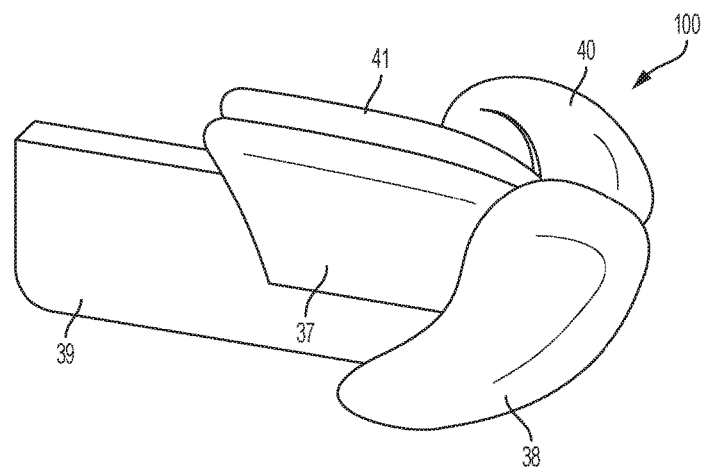
FIG. 11A is a top perspective view of an assembly including the casts shown FIGS. 9 and 10, according to various aspects.
Figure 11B:
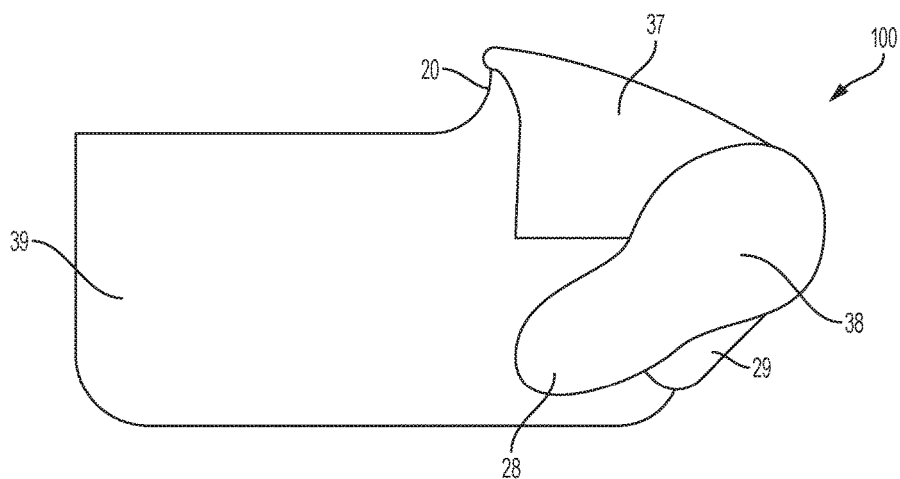
FIG. 11B is a lateral perspective view of the assembly shown in FIG. 11A.

The septal cartilage 39 is configured to be attachable to the right upper lateral cartilage 37 and the left upper lateral cartilage 41 and the right lower lateral cartilage 38 and the left lower lateral cartilage 40, for example, as shown in FIGS. 11-12. The septal cartilage 39 is also configured to be insertable into or between the lateral nasal bones 6 of the midface boney structure 5 such that the notch 20 is attachable to the lateral nasal bones 6.

Figure 10:
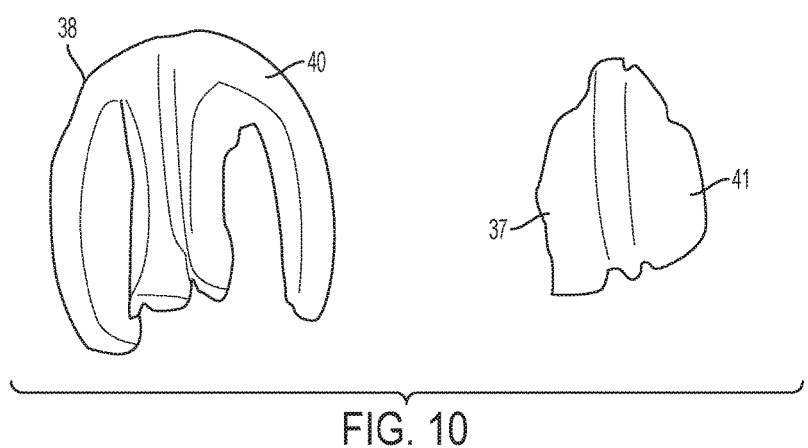
FIG. 10 is a lateral view of casts of the assembled upper (right) and lower (left) lateral cartilages, according to various embodiments.

The nasal septum 39 and bilateral upper and lower right and left lateral cartilages are replicated using a flexible, soft, and carvable material (such as platinum silicone). These cartilages may be shaped to have common deformities such as septal deviations, septal spurs, fractures, internal/external nasal valve narrowing/collapse, tip deformity, over/under nasal projection and rotation, cephalic malrotation, dorsal hump, deformities simulating prior surgical procedures, among others. The cartilages can also be sutured. The cartilage pieces are made by first creating a model including a modified skull 1 and a midface boney structure 5, as shown in FIG. 12, and creating a desired shape of the cartilages, made of clay or epoxy, then creating a mold of them (shown in FIGS. 6-8) and then casting the pieces within these molds (FIGS. 9-11). Alternatively, either the models, molds, or casts could be computer generated and 3D printed.

Referring back to FIG. 6, a right mold 16 and a left mold 17 for the nasal septum are shown. The right and left molds 16 and 17 include an anterior septum portion 18b, a posterior septum portion 19b, a notch portion 20b for forming the notch 20 described above, an indentation portion 21b, an air vent 22, and a septal spur portion 23b.

Figure 7:
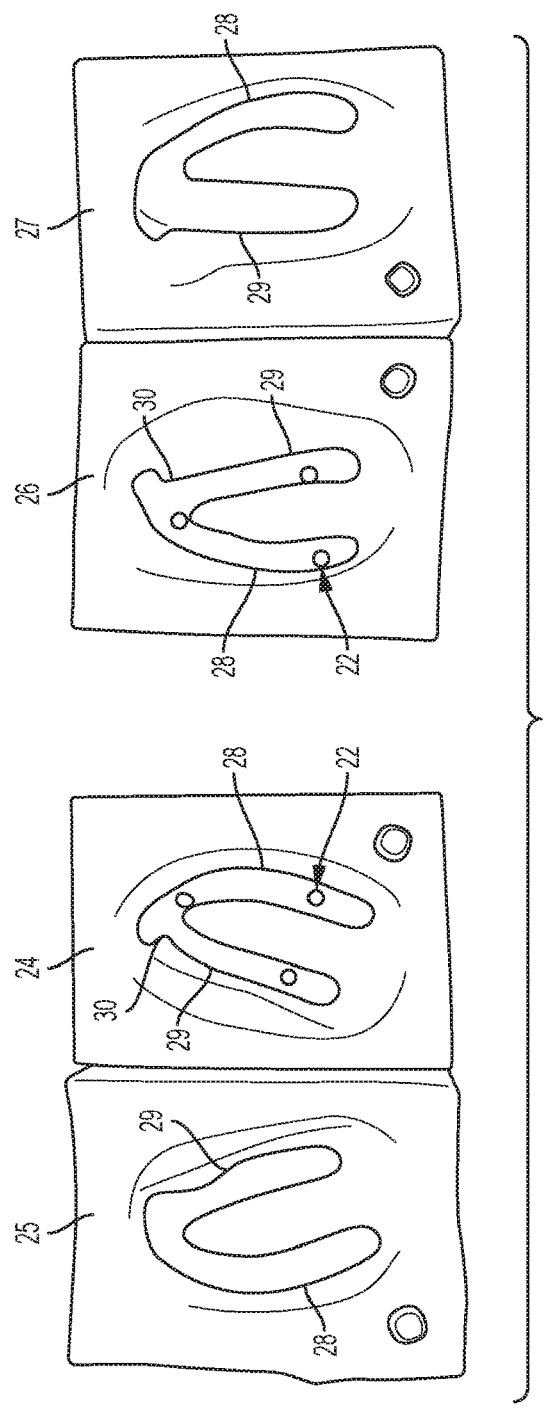
FIG. 7 is a top view of molds which are useable to create lower lateral cartilages.

Referring back to FIG. 7, a left lower lateral cartilage posterior mold 24 and a left lower lateral cartilage anterior mold 25 are shown. The left lower lateral cartilage posterior mold 24 and the left lower lateral cartilage anterior mold 25 include an air vent 22 and a lateral crura of lower lateral cartilage portion 28 and medial crura of lower lateral cartilage portion 29. The left lower lateral cartilage posterior mold 24 also includes a notch 30 where the left lower cartilage 40 fits with the septal cartilage 39. FIG. 7 also shows a right lower lateral cartilage posterior mold 26 and a right lower lateral cartilage anterior mold 27. The right lower lateral cartilage posterior mold 26 and a right lower lateral cartilage anterior mold 27 include a lateral crura of lower lateral cartilage portion 28 and medial crura of lower lateral cartilage portion 29. The right lower lateral cartilage posterior mold 26 also includes a notch 30, where the right lower cartilage 38 fits with the septal cartilage 39.

Figure 8:
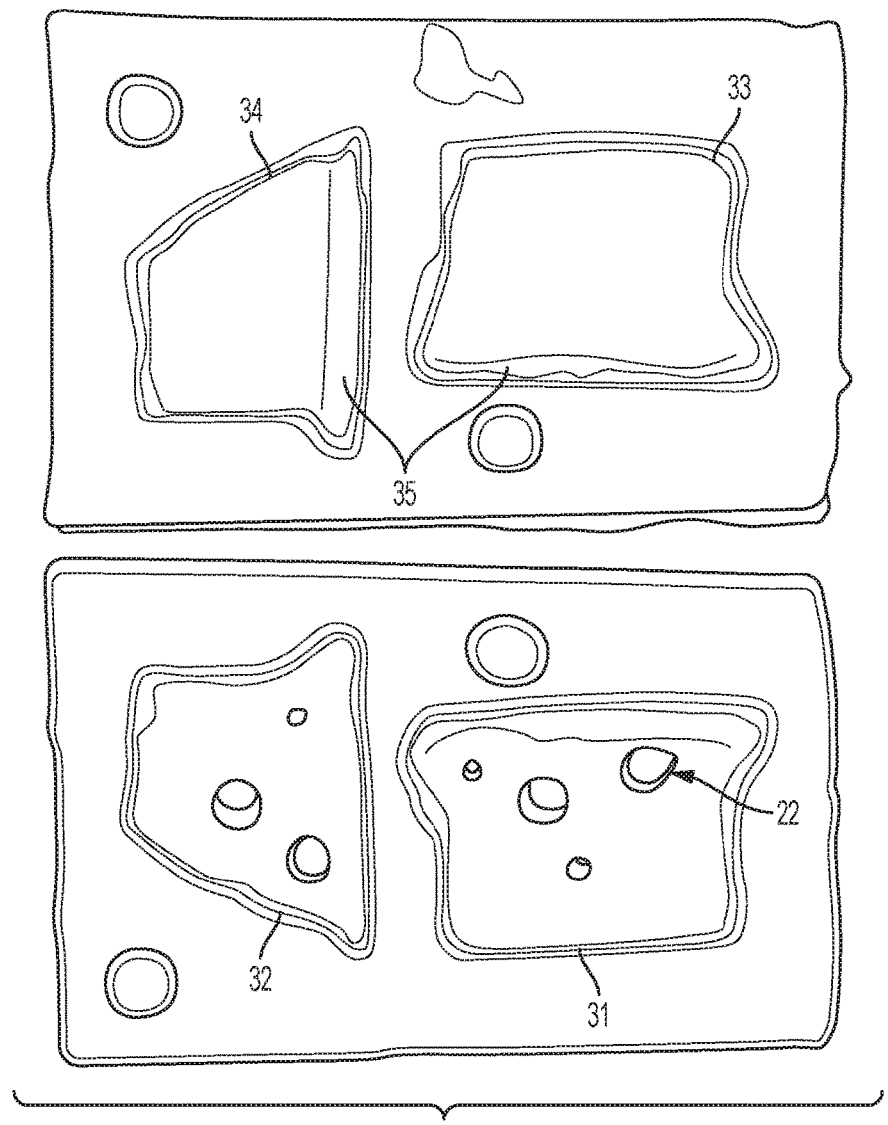
FIG. 8 is a top view of molds which are useable to create upper lateral cartilages.

Referring back to FIG. 8, a medial aspect of left upper lateral cartilage mold 33 and a medial aspect of right upper lateral cartilage mold 34 is shown. The medial aspect of left upper lateral cartilage mold 33 and the medial aspect of right upper lateral cartilage mold 34 include a groove 35 where the left upper lateral cartilage 41 and the right upper lateral cartilage 37 fit onto the septal cartilage 39. FIG. 8 also shows a lateral aspect of left upper lateral cartilage mold 31 and a lateral aspect of right upper lateral cartilage mold 32 which include air vents 22.

Figure 6:
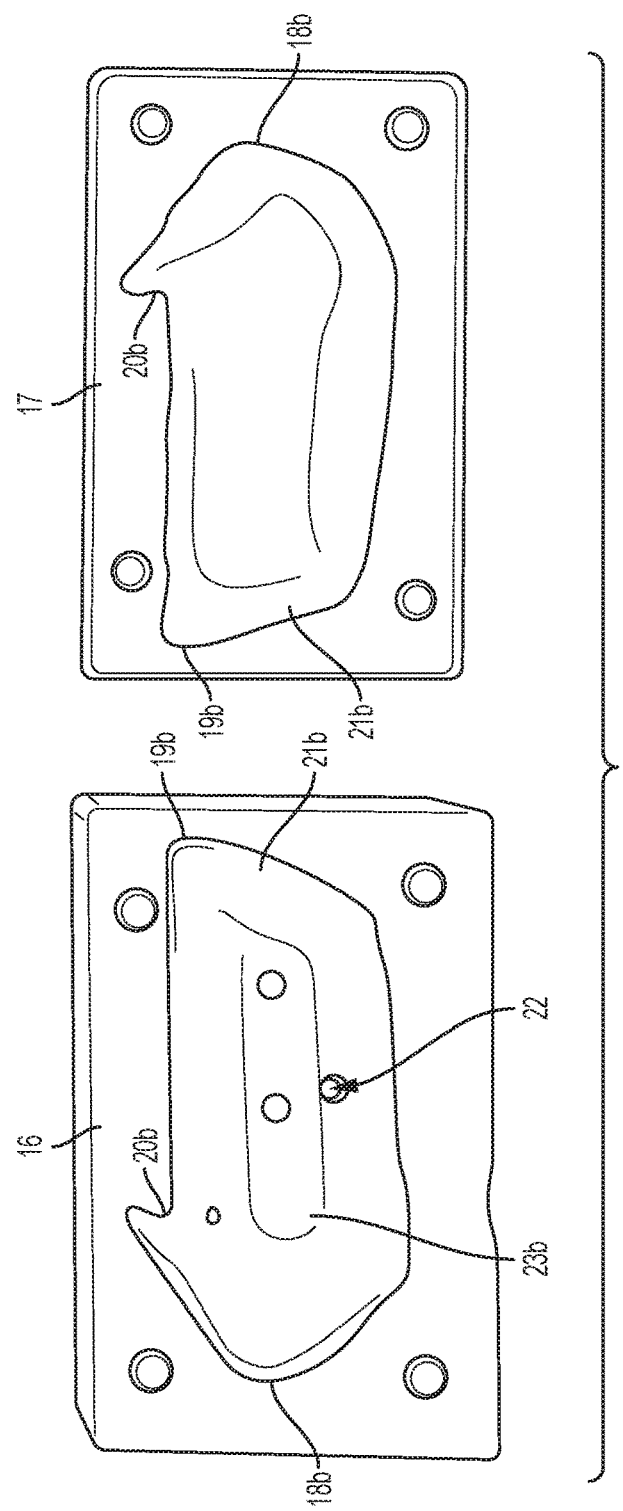
FIG. 6 is a top view of molds which are useable to create nasal septal cartilage.
Figure 13:
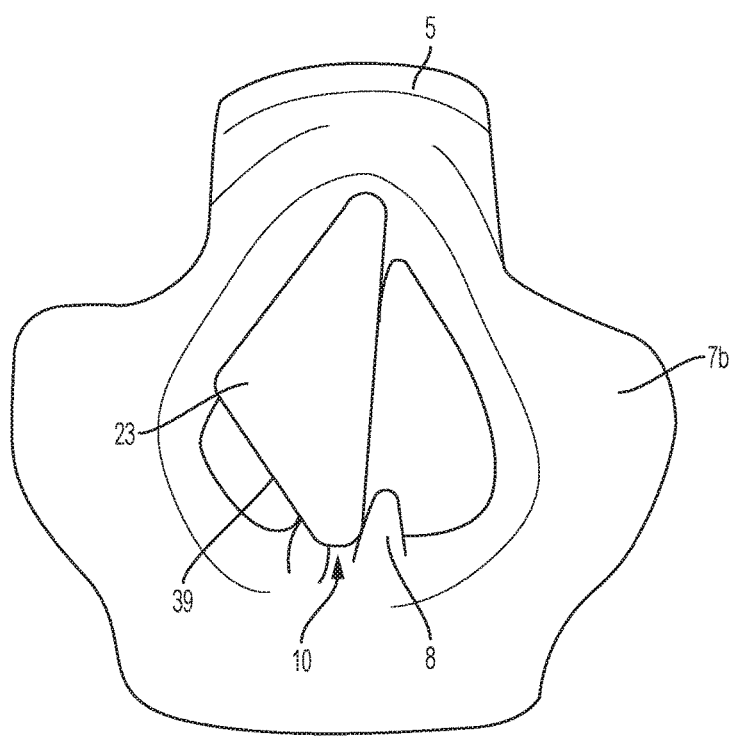
FIG. 13 is a front view of septal cartilage fitting into a groove within the midface boney structure shown in FIG. 3A.
Figure 14:
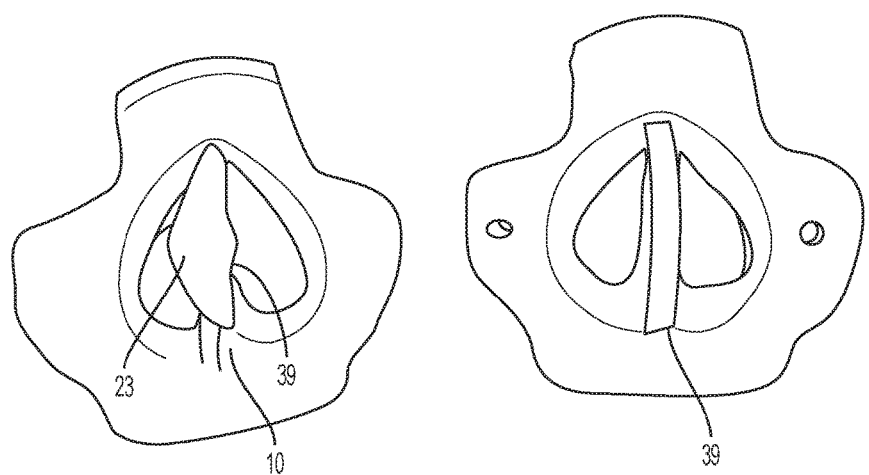
FIG. 14 shows front views of the midface boney model shown in FIG. 3A with a deviated and straight septum, on the left and right, respectively.

FIG. 12 uses modeling clay/epoxy which is the base for the molds shown in FIGS. 6-8. FIGS. 9 and 10 show the flexible material that simulates cartilage as formed using the various molds described above. FIG. 11 shows all of the cartilaginous pieces assembled anatomically into a nose model simulator 100 using, for example, a silicone adhesive which is capable of holding the cartilages together, but is also able to be separated using surgical instruments. As shown in FIG. 13, the septal cartilage 39 is configured to fit within the slot 10 of the midface boney structure 5 that extends to the posterior boney septum 9 of the midface boney structure 5. As shown in FIG. 13, the septal cartilage is altered to include a septal spur 23. As shown in FIG. 14, the septal cartilage 39 is configured to be inserted into the midface bony structure 5 with different pathologies, such as the septal spur 23. FIGS. 15A and 15B show the nasal cartilages assembled and placed into the midface boney structure 5 and placed within the modified skull 1 (described in more detail below).

Nasal Mucosa

Figure 16A:
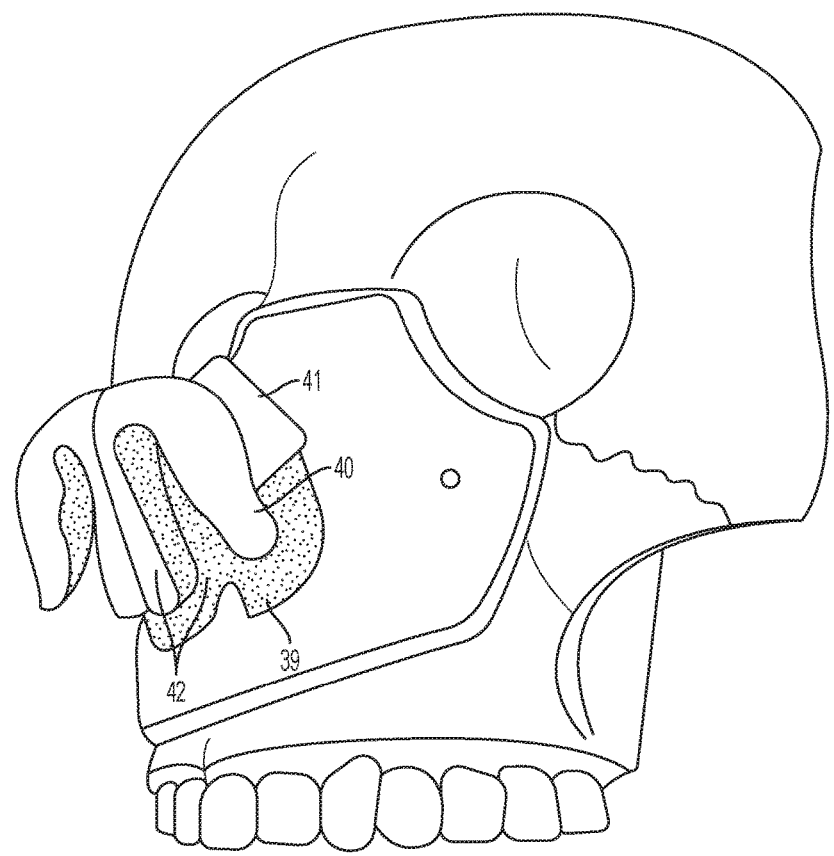
FIG. 16A is a lateral perspective view showing a simulated mucosal lining to cartilaginous structures of the assembly shown in FIG. 15A.
Figure 16B:
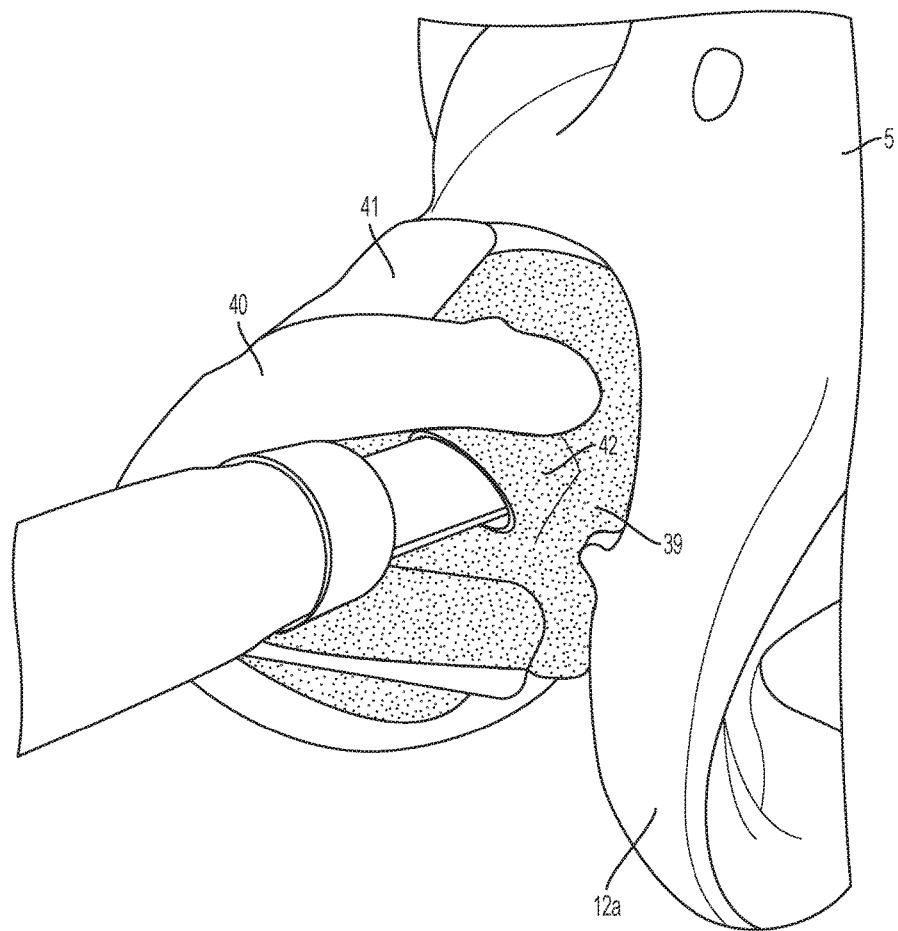
FIG. 16B is a bottom perspective view of the assembly shown in FIG. 16A.

Simulated nasal mucosa 42 can be applied by covering the surfaces of the model with a soft, flexible material that adheres to the model lining but is also capable of being elevated off with surgical instruments (for example a silicone rubber such as smooth-on Dragon Skin®). For example, FIG. 16A shows the simulated nasal mucosa 42 applied to the nasal cartilages. The mucosa 42 is able to be cut with a scalpel, elevated off of the cartilages, and is capable of being sutured together. FIG. 16B shows an incision made within the septal mucosa 42 and elevated off the septal cartilage 39. In some embodiments, the mucosa 42 lines the entire nasal cavity including over the turbinate bone 44 and nasal bones 6. The placement of the nasal mucosa 42 allows for simulation of raising submucosal flaps during septoplasty, allows for understanding and performing the intranasal incisions when opening the nose for an open rhinoplasty, and serves to hold the structures of the nose together during the simulated surgical procedures.

External Soft Tissue and Skin

Figure 17:
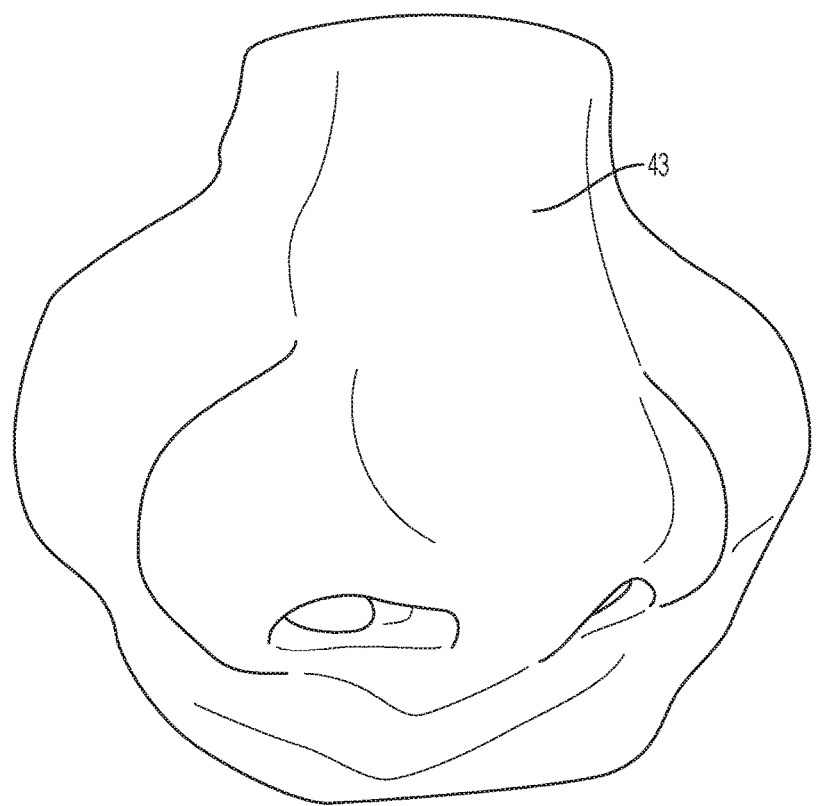
FIG. 17 is a front perspective view of simulated nasal soft tissue and skin covering the underlying structures of the assembly shown in FIG. 16A.

Simulated soft tissue and skin can be applied by coating the nose model simulator 100 with a simulated nasal skin 43, as shown in FIG. 17, to create the anatomic model 101. The anatomic model 101 is configured to represent one or more anatomical structures (for example, a nose). The simulated nasal skin 43 includes, for example, a soft, flexible material that adheres to the nose model simulator 100 but is also capable of being elevated off of the nose model simulator 100 using surgical instruments (for example a silicone rubber such as smooth-on Dragon Skin®). As shown in FIG. 17, the simulated nasal skin 43 is applied externally to the nose model simulator 100. This allows for creation of the soft tissue envelope, including the columella and nasal ala. With this in place, simulation the surgical incisions and steps necessary to open the nose for a rhinoplasty can be accomplished. In addition, it helps create a more realistic and narrowed surgical view, and allows for evaluation of the cosmetic effects of underlying structure manipulation.

Base

Figure 1B:
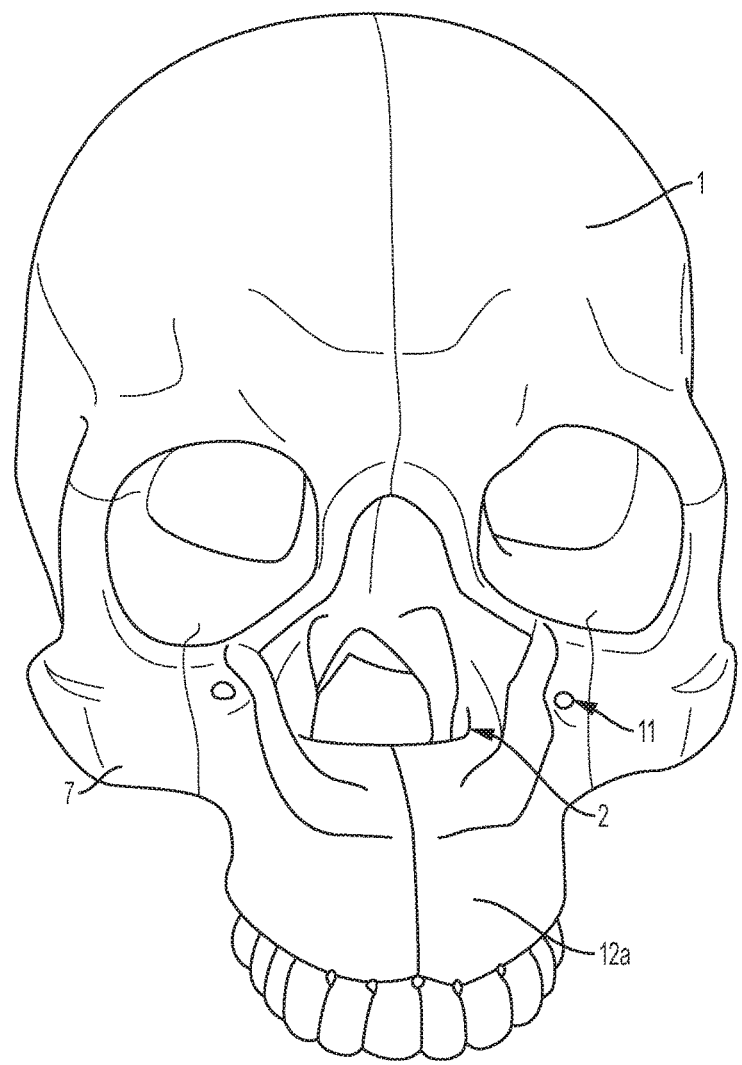
FIG. 1B is a front perspective view showing the modified skull shown in FIG. 1A.
Figure 19:
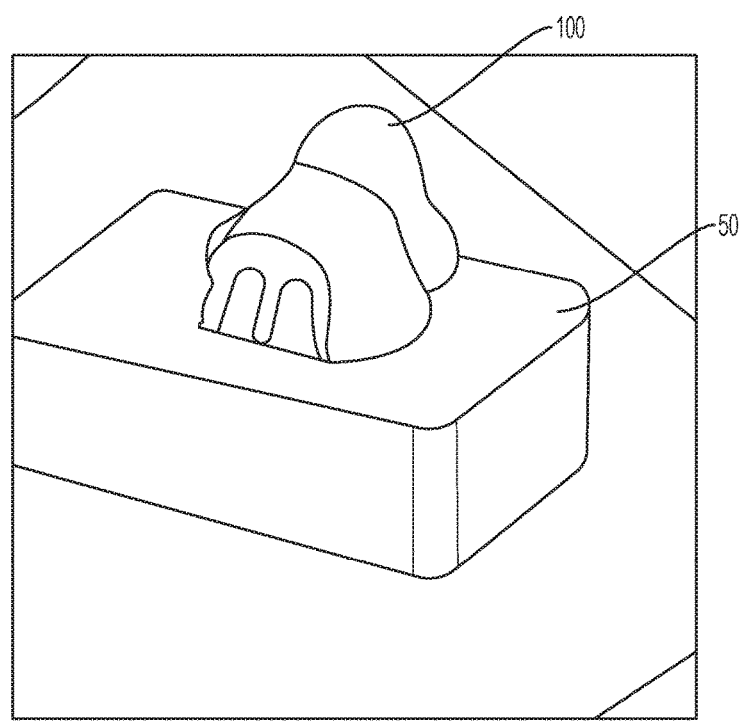
FIG. 19 is a top perspective view of the midface boney model shown in FIG. 3A and a foam base, according to an exemplary embodiment.

According to various exemplary embodiments, the nose model simulator 100 as described herein (for example, the nose model simulator 100 which includes the midface boney model 5) may be configured to be securably attachable to an external structure or specialized support which is suitable for holding and/or supporting the nose model simulator 100 and/or the midface boney model 5. For example, the nose model simulator 100 may be configured to be securably attachable to the modified skull 1 (shown in FIGS. 1A-1B) as shown in FIGS. 12 and 15A and 15B. As shown in FIGS. 1A-1B, the modified skull 1 includes a midface cavity 2 configured to receive the midface boney model 5, a skull midface portion 7 having one or more holes 11 configured to receive fasteners and an inferior maxilla portion 12a. As another example, the nose model simulator 100 is configured to be placed into a foam holder 50 (as shown in FIG. 19).

However, the nose model simulator 100 is not particularly limited in this regard. For example, the nose model simulator 100 may be configured to stand alone. The nose model simulator 100 is configured to be securably attachable using any suitable means. For example, the nose model simulator 100 is configured to be securably attachable to the modified skull and/or midface boney model 5 using a suitable, commercially available epoxy. The midface boney model 5 is configured to be attachable to the modified skull 1 using any means, for example using fasteners (e.g., screws), as shown in FIG. 12.

Examples of Uses of the Device

Surgical Training

The nose model simulator 100 is an anatomically correct replication of important nasal structures that allow surgical trainees to better understand the nasal anatomy and on which to learn to perform key surgical procedures. The nose model simulator 100 shown in FIG. 17 is provided for use in training a person to perform a medical procedure on the nose or within the nasal cavity. The nose model simulator 100 is adapted to simulate a human nose, thereby enabling a trainee (e.g., a medical doctor, resident, medical student, or other medical practitioner or personnel) to be provided with a realistic exposure and evaluation for the cosmetic and functional changes resulting from alteration of the underlying cartilaginous and boney structures of a patient's nose. Additionally, although the nose model simulator 100 shown in FIG. 17 is described herein primarily with reference to a human nose and patient, it may be adapted and configured as necessary to simulate an animal skull and patient. The nose model simulator 100 is configured for simulation of raising the soft tissue envelope.

The medical procedure to be trained utilizing the nose model simulator 100 may be required or desired for either treatment or diagnostic purposes. For this application, the nose model simulator 100 is used for training the performance of surgical correction of the turbinates, nasal cartilages, or nasal bones for either functional or cosmetic indications.

According to one exemplary embodiment, the medical training procedure using the nose model simulator 100 is performed though the nostril without opening the soft tissue envelope of the nose. Here, the trainee would use an instrument such as a nasal speculum and headlight, or alternatively an endoscope, to visualize the structures within the nose.

Once the nasal cavity is visualized through the nostril, a number of procedures could then be performed. One procedure, for example, would be the performance of a septoplasty. In this procedure, an incision would be made into the simulated septal mucosa, and a surgical instrument such as a caudal elevator would be used to raise the mucosa (creation of submucosal flaps) off the septal cartilage (as shown in FIG. 16B). Various anatomic variants of the septal cartilage could be simulated such as septal deviations, septal spurs, septal perforations, and septal fractures with or without invagination of the septal mucosa. Successful elevation of the submucosal flaps would be indicated by elevation without tears in the mucosa. Once the submucosal flap is elevated, a septoplasty with removal of a portion of the septal cartilage (such as a portion of the septal cartilage casts shown in FIG. 9) would be performed using standard surgical instruments. A key to this procedure would be ensuring that sufficient caudal and dorsal septal cartilage necessary for structural support remain.

A second example would expand upon the septoplasty already performed to perform a closed rhinoplasty in which various grafts (spreader grafts, lateral crural strut grafts, etc.) are carved from the removed septal cartilage (such as the septal cartilage casts shown in FIG. 9). In addition, a limited dorsal hump reduction using a rasp could be performed to smooth out the dorsal nasal bones.

Through a different approach, such as the open rhinoplasty approach, the nose could be opened for the procedures. In this instance, an inverted V incision could be marked out on the columella and a scalpel used to cut along these markings and along the soft tissue just anterior to the caudal margin of the medial crura (such as the upper and lower lateral cartilages shown in FIG. 10). Marginal incisions could be made within the nose through the simulated mucosa along the caudal aspect of the lateral crura of the lower lateral cartilages. The skin and soft tissue of the columella could be elevated and incisions joined to meet the marginal incisions. The soft tissue and skin of the nose model simulator 100 shown in FIG. 17 could then be elevated off of the dorsal aspect of the lower and upper lateral cartilages (which are shown in FIG. 10) and the dorsum of the nasal bones. This would complete the opening of the soft tissue envelope as an approach to an open rhinoplasty. Various alterations or modifications in these steps could also be performed based on institution and instructor preference.

After successful completion of opening the soft tissue envelope, multiple other procedures could be performed. These include dividing the lower lateral cartilages (shown in FIG. 10) to expose the septal cartilage. Accordingly, this procedure includes raising submucosal flaps as described above but through an open approach. Additionally, septoplasty may be performed as described above, but through an open approach, again ensuring sufficient caudal and dorsal septum remain for structural support. Additionally, carving of the removed septal cartilage into various types of cartilage grafts may be performed. These may include but are not limited to spreader, extended spreader, autospreader, butterfly, lateral crural strut, columellar, alar batten, alar rim, and tip grafts. Once the grafts have been fashioned, they may be appropriately placed and secured into place using suture. Other work on the nasal cartilages may also be performed; these include but are not limited to swinging door techniques, cephalic trim, dorsal hump reduction, dome suturing of the lower lateral cartilages, and lateral crural replacement.

Through the open or closed approaches, procedures of the nasal bones may also be performed. These may include but are not limited to rasping or chiseling of the nasal bones, performance of medial or lateral osteotomies, performance of percutaneous osteotomies, and resetting of nasal fractures.

A further procedure that may be performed on the device is that of a turbinoplasty. A multitude of methods to accomplish this exist. One example of such would be making an incision in the mucosa at the head of the turbinate and using an elevator to free the mucosa off of the underlying nasal bone. Following this, placement of a microdebrider or another instrument may be simulated.

Once all desired procedures have been performed on the nasal model, the soft tissue and skin may be replaced. The skin and mucosa may be closed with the appropriate suturing material, and the left and right septal mucosa can be sewn together using a quilting stitch. The functional and cosmetic changes made to the nose can then be appreciated.

In another exemplary method of using the nose model simulator 100, defects in the nose and nasal cavity from trauma or resection of a tumor can be simulated. With this defect, trainees can learn to recreate the structures and layers of the nose using cartilage carved from separate pieces of septal cartilage (such as the septal cartilage casts shown in FIG. 9) or pieces of synthetic cartilage in the shape of rib cartilage. Mucosal flaps such as septal mucosa flaps or turbinate mucosal flaps, among others, can be created by cutting and elevated the desired nasal mucosa, moving it to the desired location, and suturing it into place. Furthermore, advancement flaps or interpolated flaps of the nasal soft tissue and skin can be performed to cover soft tissue defects and sutured into place.

In a further exemplary embodiment of the method of using the nose model simulator 100, typical nasal deformities seen in patients with cleft lip and palate can be simulated in order to simulate and train in the performance of cleft rhinoplasty.

Not only can these models be used for surgical training, they can also be used for surgical testing to ensure medical students, residents, fellows, or other medical personnel can perform and understand the given procedures.

Surgical Planning

Computer generated models of a given patient's nasal anatomy can be generated from patient imaging (CT or MM) and then used to create 3D printed molds or models to create a device that resembles the specific patient's nasal deformity. This model can be used for surgical planning, practicing of techniques prior to the real-life surgical procedure, or demonstration of anticipated alterations in the structure or function of the nose.

Patient and Medical Education

The nose model simulator 100 can be used to explain the key structures of the nasal anatomy to patients, students, medical personnel, and others. This can be used to demonstrate and explain where anatomical abnormalities are located, what structures can be altered surgically, causes of nasal obstruction, and what procedures were performed and what structures were altered during a surgery. Furthermore, models that depict named and tested nasal deformities (for example open roof deformities, inverted V deformity, alar retraction, hanging columella, dorsal hump, dorsal deviation, among others) can be created to help explain and test upon these concepts.

Commercial Use

The device can be used to demonstrate how commercially available products that are placed into, on, or within the nose or nasal cavity work, for example, the Spirox Latera absorbable nasal implant, among others.

What is claimed is:

1. A nasal model simulator for surgical/anatomical training comprising:
   (a) an anatomic model representing one or more anatomical structures;
   (b) a boney midface structure that simulates osseous midface and nasal structures; and
   (c) a simulated septal cartilage configured to fit within the boney midface structure and comprising a material which simulates cartilage tissue.

2. The nasal model simulator of claim 1, further comprising one or more simulated upper lateral cartilages comprising a material which simulates cartilage tissue.

3. The nasal model simulator of claim 2, wherein the nasal model simulator is configured to be altered to have at least one anatomical defect.

4. The nasal model simulator of claim 3, wherein the one or more simulated upper lateral cartilages comprise at least one of a narrowed internal nasal valve, a collapsed internal nasal valve, and a detached one or more upper lateral cartilages.

5. The nasal model simulator of claim 2, further comprising simulated nasal mucosa that simulate mucosal tissue and are configured to be releasably adherent to at least one of the simulated septal cartilage and the one or more simulated upper lateral cartilages.

6. The nasal model simulator of claim 1, further comprising one or more simulated lower lateral cartilages comprising a material which simulates cartilage tissue.

7. The nasal model simulator of claim 6, wherein the nasal model simulator is configured to be altered to have at least one anatomical defect.

8. The nasal model simulator of claim 7, wherein the one or more simulated lower lateral cartilages comprise at least one of a narrowed external nasal valve, a collapsed external nasal valve, a resected simulated lower lateral cartilage, a cephalic malrotation, an inner recurvature of the simulated lower lateral cartilages, and a flared medial crura.

9. The nasal model simulator of claim 6, further comprising simulated nasal mucosa that simulate mucosal tissue and are configured to be releasably adherent to at least one of the simulated septal cartilage and the one or more simulated lower lateral cartilages.

10. The nasal model simulator of claim 1, further comprising simulated nasal mucosa that simulate mucosal tissue and are configured to be releasably adherent to the simulated septal cartilage.

11. The nasal model simulator of claim 10, wherein the nasal model simulator further comprises simulated external nasal and midface soft tissue and skin constructed of a material which simulates skin and soft tissue.

12. The nasal model simulator of claim 1, wherein the nasal model simulator is configured to be altered to have at least one anatomical defect.

13. The nasal model simulator of claim 12, wherein the boney midface structure comprises at least one of an altered nasal bone length, a nasal bone fracture, a boney nasal deviation, a dorsal nasal hump, and an open roof deformity.

14. The nasal model simulator of claim 12, wherein the septal cartilage comprises at least one of a septal deviation, one or more septal spurs, one or more septal fractures, and one or more septal perforations.

15. The nasal model simulator of claim 12, wherein the nasal model simulator is configured to be altered to simulate an anatomic defect comprising one or more of a neoplasm, a tumor resection, and a trauma.

16. The nasal model simulator of claim 1, wherein the nasal model simulator further comprises at least one anatomical structure of a turbinate and a nasal lacrimal duct.

17. The nasal model simulator of claim 1, wherein the nasal model simulator defines one or more passageways configured to be used for airflow simulation based on at least one of a normal and an altered anatomy.

18. The nasal model simulator of claim 1, wherein the nasal model simulator is configured to conform to a patient-specific anatomy based on a patient-specific imaging.

19. The nasal model simulator of claim 1, wherein further comprising simulated external soft tissue and skin over the simulated septal cartilage to demonstrate expected changes in nasal form and function from surgical manipulation.

20. The nasal model simulator of claim 1, wherein the midface structure is configured to fit into at least one of an anatomically correct skull, a hemi-skull, or an external device.

* * * * *